United States Patent [19]

Peters et al.

[11] 3,984,303

[45] Oct. 5, 1976

[54] MEMBRANE ELECTROLYTIC CELL WITH CONCENTRIC ELECTRODES

[75] Inventors: Edward J. Peters, Chardon; J. Edward Loeffler, Jr., Willoughby, both of Ohio

[73] Assignee: Diamond Shamrock Corporation, Cleveland, Ohio

[22] Filed: July 2, 1975

[21] Appl. No.: 592,385

[52] U.S. Cl. .............................. 204/260; 204/252; 204/259; 204/272
[51] Int. Cl.$^2$ ..................... C25B 1/24; C25B 1/26; C25B 9/00; C25B 11/00
[58] Field of Search ........... 204/260, 272, 265, 259, 204/252

[56] References Cited
UNITED STATES PATENTS

| | | | |
|---|---|---|---|
| 1,982,224 | 11/1934 | Michel | 204/260 |
| 2,193,323 | 3/1940 | Nitzchke et al. | 204/260 X |
| 2,228,264 | 1/1941 | Freedley | 204/260 X |
| 2,583,101 | 1/1952 | Oliver | 204/260 X |
| 3,282,823 | 11/1966 | Richards | 204/272 |
| 3,390,065 | 6/1968 | Cooper | 204/95 |
| 3,404,083 | 10/1968 | Kircher | 204/272 |
| 3,827,964 | 8/1974 | Okubo et al. | 204/257 |

OTHER PUBLICATIONS

B388,701, Jan. 1975, Johnson, 204/258.

*Primary Examiner*—John H. Mack
*Assistant Examiner*—A. C. Prescott
*Attorney, Agent, or Firm*—William A. Skinner

[57] ABSTRACT

Electrolytic cell in which hollow cylindrical electrodes are arranged concentrically, anode within the cathode, and having a tubular ion permeable membrane supported on the outside of the anode separating the anolyte and the catholyte. The anolyte is contained within the membrane-anode structure, affording reduced construction cost and greater efficiency per unit of cell volume.

15 Claims, 7 Drawing Figures

U.S. Patent  Oct. 5, 1976  Sheet 1 of 4  3,984,303

MEMBRANE ELECTROLYTIC CELL WITH CONCENTRIC ELECTRODES

FIELD OF THE INVENTION

The present invention relates generally to an electrolytic cell assembly for the production of alkali metal hydroxides and halogens. More particularly, the invention concerns an electrolytic cell in which the electrodes are arranged concentrically one within the other and the anode is covered with a tubular ion permselective membrane.

BACKGROUND OF THE INVENTION

Halogens and alkali metal hydroxides have been conventionally produced by the electrolysis of aqueous alkali metal halide solutions in diaphragm-type cells. Such cells generally have an opposed anode and cathode separated by a fluid permeable diaphragm, usually of asbestos, forming separate anode and cathode compartments. In operation, brine is fed to the anode compartment wherein halogen gas is generated at the anode, and the brine then percolates through the diaphragm into the cathode compartment wherein alkali metal hydroxide is produced. The alkali metal hydroxide thus produced contains large amounts of alkali metal halide, which must be removed by further processing to obtain the desired product.

Recently, electrolytic cells have been developed which utilize a permselective cation-exchange membrane in place of the conventional diaphragm. Such membranes, while electrolytically conductive under cell conditions, are substantially impervious to the hydrodynamic flow of liquids and gases. In the operation of membrane cells, brine is introduced into the anode compartment wherein halogen gas is formed at the anode. Alkali metal ions are then selectively transported through the membrane into the cathode compartment. The alkali metal ions combine with hydroxide ions generated at the cathode by the electrolysis of water to form the alkali metal hydroxide.

Membrane-type electrolytic cells have numerous advantages over conventional diaphragm cells, including the production of relatively pure alkali metal hydroxide in high concentrations, the production of more halogen per unit of cell volume, and the ability to operate at higher, more efficient, current densities. However, ion permeable membranes used in such cells are not readily adaptable to the angular and planar configuration of conventional cell apparatus. Additionally, due to their relatively soft and flexible nature, it is often difficult to position the membrane relative to the electrodes and to obtain a reliable seal at the membrane-cell wall joints.

Accordingly, it would be highly desirable to provide a cell design which retains the advantages inherent in use of the membranes, while avoiding the disadvantages.

SUMMARY OF THE INVENTION

In accordance with the invention there is provided an electrolytic cell for the production of halogen gas and alkali metal hydroxide, having a hollow tubular cathode member with a hollow tubular anode member disposed concentrically within the cathode. Each electrode member has liquid permeable walls to allow the circulation of electrolyte. The anode, preferably of dimensionally stable construction, is covered on its outer surface with an electrically conductive, ion permselective membrane. This membrane is tubular in shape, and is fitted over the outer surface of the anode, thereby separating the anode and cathode surfaces.

An outer shell is placed around the cathode member, thereby forming a cathode compartment enclosed by the membrane surface and the outer shell. An anode compartment is also formed, enclosed by the inner surface of the membrane and suitable caps at the ends of the tubular anode member.

Means are provided for introducing alkali metal halide brine into the tubular membrane-covered anode structure and for withdrawing halogen gas and spent brine from the anode compartment. Means are also provided for circulating fluid through the cathode compartment, and for removing alkali metal hydroxide and hydrogen from the cathode enclosure. Suitable conductor means are attached to the anode and cathode members for supplying electric current along substantially their entire length.

Such cells, in addition to being used as individual units, may also be connected in series fashion to form a larger multi-cell electrolyzer. Such an electrolyzer may utilize common catholyte inlet means and common alkali metal hydroxide and hydrogen outlet means, fitted to the outer shells of the individual cell units. Alternatively, the cell units may be placed in a common housing which serves as a cathode compartment enclosure for the entire electrolyzer, thereby eliminating the individual outer shells.

The membrane cell apparatus of the invention has numerous advantages, including an anode compartment in which the anolyte is contained within the membrane and anode. Such design substantially eliminates the need for a chemically resistant material for containing the corrosive anolyte, with its associated high costs.

Additionally, the tubular concentric electrode configuration allows the use of conductor means which can be placed in contact with the electrodes along substantially their entire length, providing more even current distribution and improved current density.

Further, due to its tubular design, the problems of sealing the membrane at its junction with the cell walls is greatly reduced. The membrane sealing area per unit area of electrode is much smaller than in the conventional design, and the nature of the membrane material allows for either a forced fit or a shrink seal around the ends of the anode. Construction tolerances are also more easily achieved, since the cylindrical shape is inherently more stable than flat sheets of equivalent area.

The apparatus of the invention also provides for a greater efficiency per unit of cell volume and reduced cell construction costs, due to the elimination of numerous joints by use of the tubular design.

BRIEF DESCRIPTION OF THE DRAWINGS

Other advantages of the invention will become apparent upon reading the following detailed description and upon reference to the drawings, in which.

Figure 1:
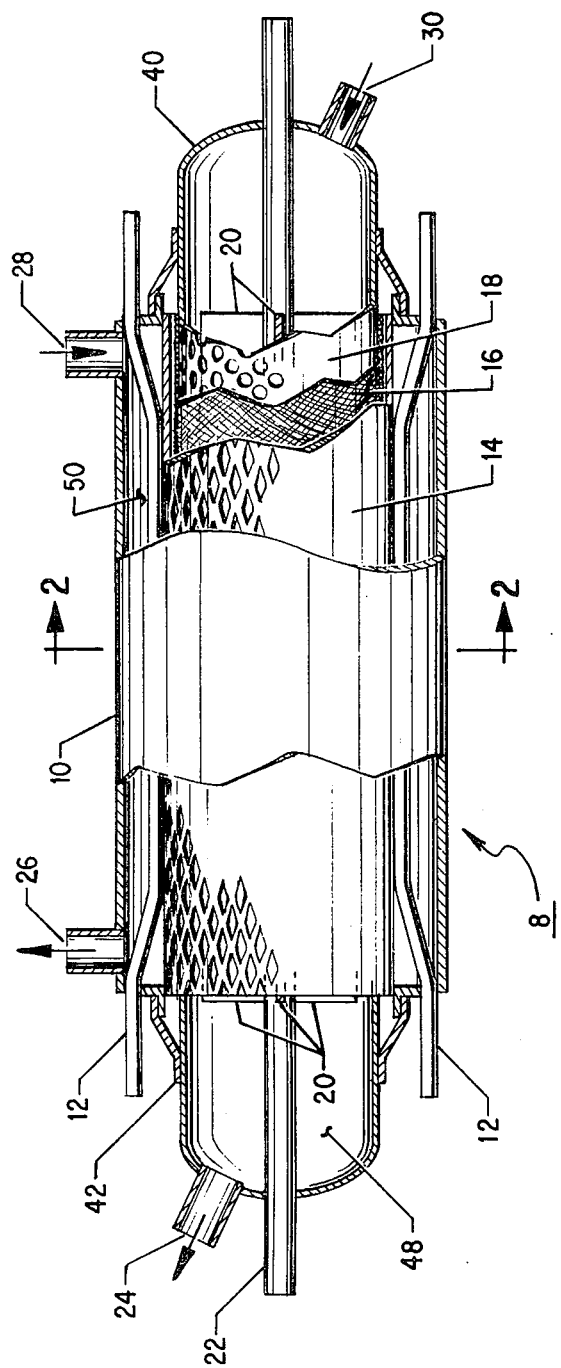
FIG. 1 is a simplified side elevational view, partly broken away and in section, of the electrolytic cell of this invention.
Figure 2:
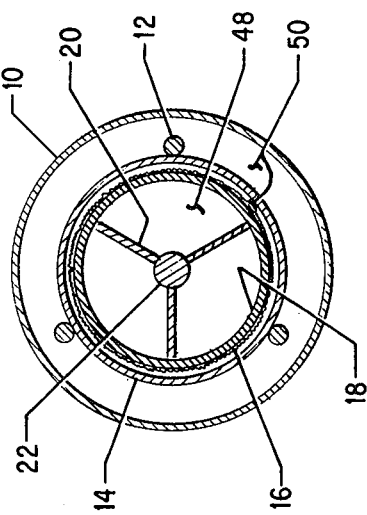
FIG. 2 is a sectional view of the electrolytic cell of FIG. 1 along plane 2—2.

While the invention will be described in connection with a preferred embodiment, i.e. the electrolysis of sodium chloride brine to produce chlorine and caustic soda, it is to be understood that this is only for purposes of illustration and is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning to the drawings, with particular reference to FIGS. 1–5, there is shown an electrolytic cell unit indicated generally as 8, comprising outer shell 10 which surrounds the hollow tubular cathode member 14 and encloses the cathode compartment 50 and liquid catholyte. Disposed concentrically within the cathode member 14 is a hollow tubular anode member 18. The anode member 18 is covered by an ion permeable tubular membrane 16 which separates the cell into anode compartment 48 and cathode compartment 50 and which forms substantially the entire retainer for the anolyte. An anode conductor bar 22 is located within the anode member 18, along a common axis, and is electrically connected to the anode by radial anode conductors 20. Cathode conductor bars 12 lie along the outer surface of cathode member 14 in electrical contact therewith.

In the particular cell illustrated, the outer shell 10 may be constructed of any appropriate catholyte resistant material, most generally a metal such as mild steel or nickel, a rubber-lined metal, molded hard rubber, or a polymeric material such as polypropylene or chlorinated polyvinylchloride. The outer shell 10 may have a diameter of from about 2 inches to about 26 inches, but usually ranges from 5 to 14 inches in diameter.

The hollow tubular cathode member 14 is fabricated from a catholyte resistant, electroconductive material, generally a metal such as iron, mild steel, nickel or alloys thereof. The cathode member 14 is liquid permeable, having an open area of from about 30 percent to about 70 percent, most commonly provided by expanded metal mesh rolled into tubular shape. Alternatively, the cathode member 14 may be rendered permeable to the electrolyte by the use of perforations in the tubular cathode. The cathode member may have a diameter of from about one inch to about 24 inches, and usually is in the range of 4 to 12 inches.

The hollow tubular anode member 18 is generally fabricated of a valve metal such as titanium, tantalum, zirconium, tungsten or the like which is resistant to the corrosive conditions of an electrolysis cell. The valve metals used in the anode are provided with an electrically conducting electrocatalytic coating of a platinum group metal, or mixed oxides of valve metals and platinum group metal oxides, or other electrically conducting electrocatalytic coatings. A composition which is dimensionally stable under the conditions existing in the anolyte during the electrolysis of alkali metal halide solutions is preferred.

Alternatively, the anode member 18 may be constructed using an electroconductive core such as copper or aluminum, with a coating of anolyte resistant material such as titanium or tantalum. This coating has a layer of suitable electroconductive material such as a platinum group metal, an oxide or mixture of oxides of platinum group metal, or an oxygen-containing compound of a platinum group metal on its surface.

The anode member 18 is also liquid permeable, having an open area of from about 30 percent to about 70 percent. The anode is usually constructed from expanded metal mesh rolled into tubular shape, or it may be provided by perforated metal tubing, woven metal mesh, slitted metal plate, or the like formed in tubular configuration. Anode member 18 may range in diameter from about 1 to about 24 inches, but usually is 4 to 12 inches in diameter.

The ion permeable tubular membrane 16 is disposed upon and covers the outer surface of the anode member 18, thereby separating the anode 18 and cathode 14. In this manner, separate anode compartment 48 and cathode compartment 50 are formed, with the anolyte contained within the membrane-anode structure. In one embodiment (FIG. 1) the tubular anode member 18 is connected to anolyte housing 40 at the point where the membrane-anode structure ends, thereby providing a continuation of the anode compartment 48. This extension of the anode compartment may be rubber-lined metal, plastic, or other anolyte resistant material. In a further embodiment (FIG. 4) the membrane-anode structure is sealed directly in the apertures at the ends of outer shell 10 at membrane-anode seals 32, thereby providing a fluid-tight anode chamber substantially within the membrane-anode structure itself. This seal may be accomplished in a number of ways, including the use of collars, gaskets, compression rings and the like, as well as by the fit of anode endpiece 19.

The membrane 16 preferably is of a material selectively permeable to the passage of ions and impervious to hydrodynamic flow of the electrolyte. A particularly suitable material for this membrane is a cation permeable perfluorocarbon polymer having pendant sulfonic groups (i.e. sulfonic acid and/or sulfonate groups). The membrane usually has a thickness of 0.001 to 0.010 inches. This material is comparatively flexible in nature, and may be formed into tubular shapes of the desired diameter and length by extrusion or heat sealing of flat sheets, facilitating its use in the apparatus of the invention. The diameter of the tubular membrane may range from about 1 to about 24 inches, and the length may be up to about 30 feet, although an overall cell length of 3 to 12 feet is preferred.

Depending upon the length of the cell unit, the diameter of the electrodes, and other structural factors it may be desirable to place non-conducting spacers between the membrane 16 and the cathode member 14 to maintain constant membrane-cathode spacing under actual operating conditions. Such non-conducting spacers may be in the form of O-rings, solid rods placed longitudinally, or the like.

Electrolysis current is supplied to the anode member 18 and the cathode member 14 by means of anode conductor bar 22 and cathode conductor bar 12 respectively. Anode conductor bar 22 may be located along the common longitudinal axis of the cell within the anode member 18 and extends through a weld or other seal at housing 40. Conductor bar 22 is electrically connected to anode member 18 by means of radial anode conductors 20. Both conductor bar 22 and radial conductors 20 are fabricated from an anolyte resistant, electroconductive valve metal such as titanium or tantalum. Alternatively, an electroconductive core metal such as copper or aluminum coated with anolyte resistant material such as titanium or tantalum may be used.

Figure 3:
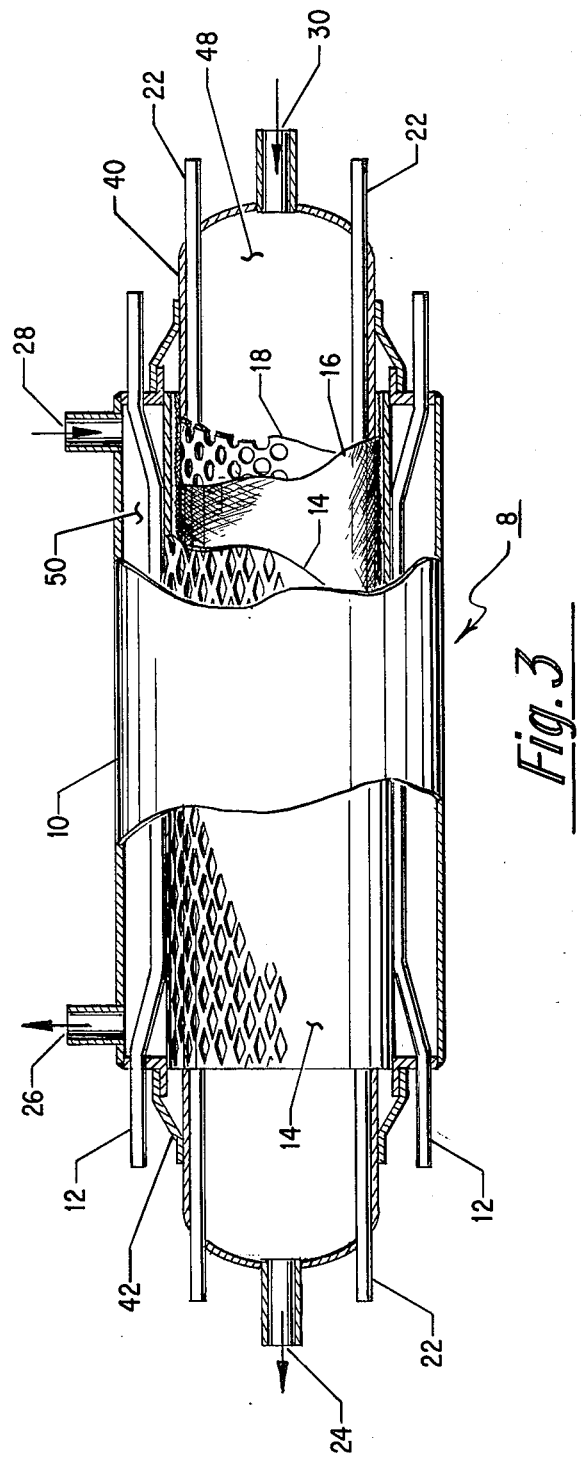
FIG. 3 is a simplified side elevational view, partly broken away and in section, of a further embodiment of the cell of the invention.

The anode conductor bars 22 may also be positioned to lie along substantially the entire length of anode member 18, in direct electrical contact along substantially the entire length of the anode member, as in FIG. 3. Alternatively, the conductor bars may be formed as an integral part of the anode member itself.

Figure 4:
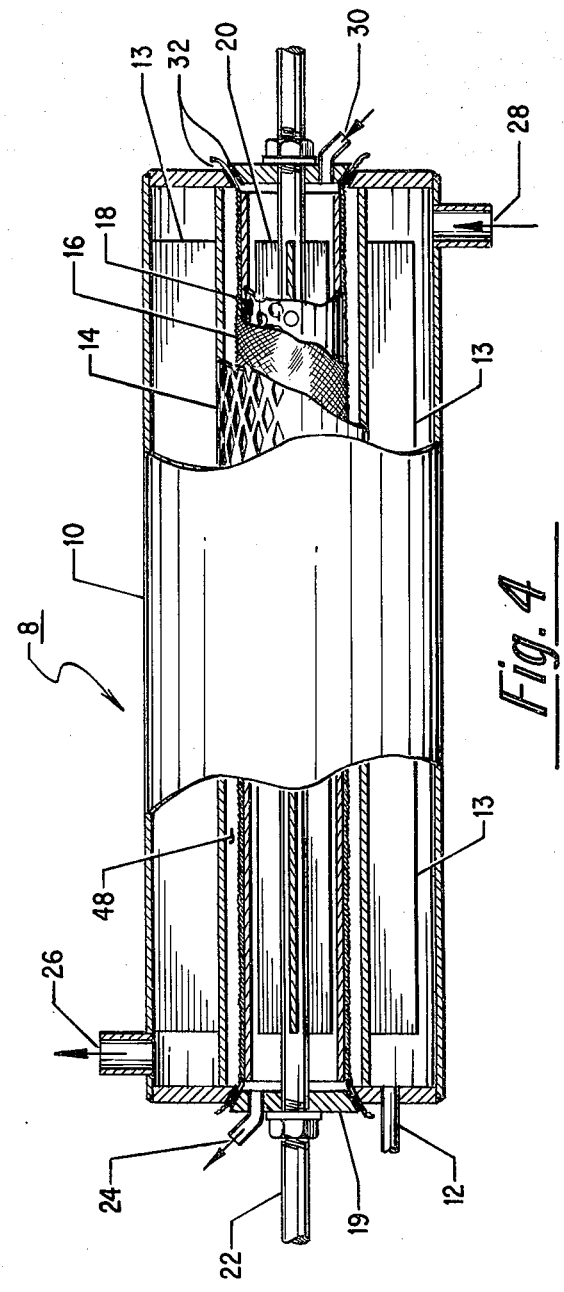
FIG. 4 is a longitudinal sectional view of another embodiment of the electrolytic cell of this invention.

The cathode conductor bars 12 are positioned in the annular space between the outer shell 10 and the cathode member 14, and lie along substantially the entire length of cathode member 14 so as to be in direct electrical contact therewith. The conductor bars pass through a weld or other seal at outer shell 10. In an alternative embodiment, such as shown in FIG. 4, the cathode conductors may take the form of radial cathode conductors 13. Outer shell 10 and housing 40 are connected at their juncture by housing seal 42. The insulating housing seal 42 serves to provide a fluid-tight seal between the anode and cathode portions of the cell, as well as insulating them electrically. The seal may be constructed of a suitable electrolyte resistant rubber or polymeric material.

Placement of anode conductor 22 along the length of the cell and within the anode member 18 insures an even distribution of current over the entire anode surface either through the radial anode conductors 20 or by direct contact with the anode member, and allows improved operation in terms of current density. These effects are further enhanced by the location of cathode conductor bars 12 along substantially the entire length of cathode member 14.

Figure 5:
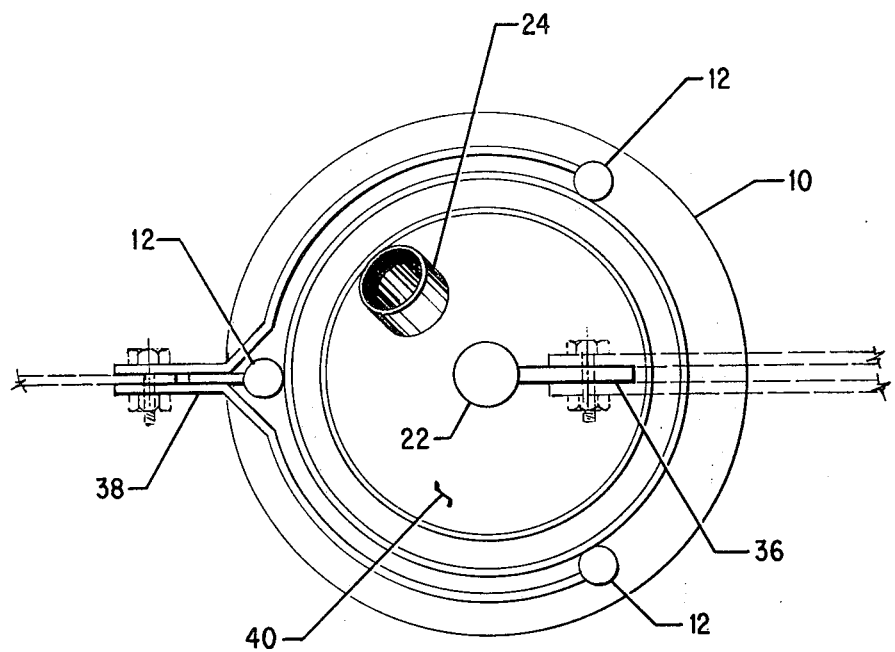
FIG. 5 is an end elevational view of the cell of FIG. 1.

As best shown in FIG. 5, an end view of one embodiment of the invention, electrolysis current is supplied to anode conductor bar 22 and cathode conductor bar 12 through anode bus bar 36 and cathode bus bar 38 respectively. These bus bars may connect individual cells in series fashion through intercell bus bars 37 to form an electrolyzer, as depicted in the top view of FIG. 6 and in FIG. 7.

Figure 6:
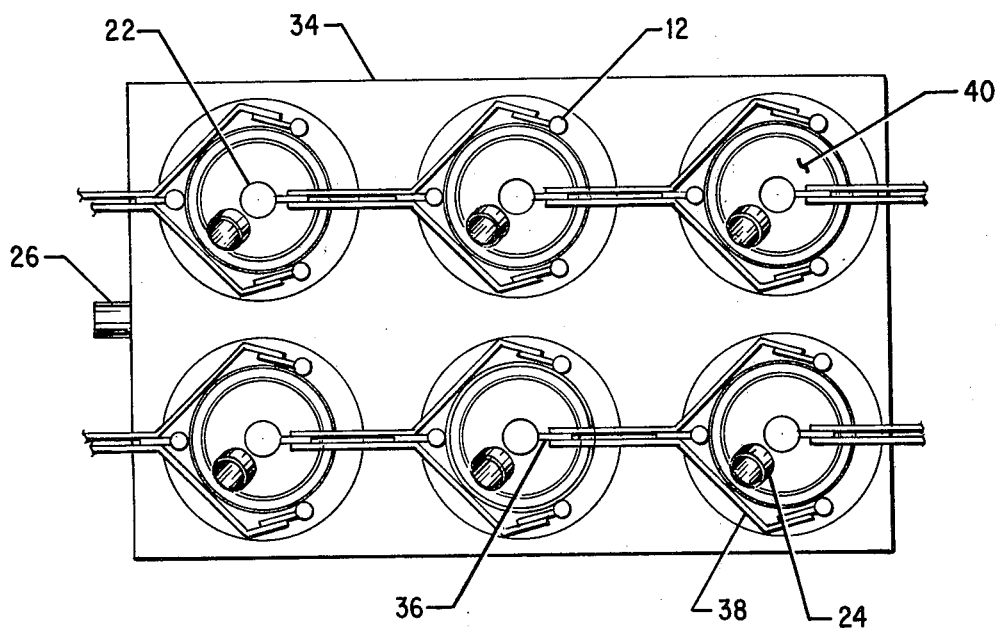
FIG. 6 is a top plan view of one embodiment of a multi-cell electrolyzer in accordance with this invention.

In accordance with a further aspect of the invention, shown in FIG. 6, multiple cell units can be combined to form an electrolyzer and enclosed in a common housing 34. This embodiment dispenses with the outer shell 10 for individual units, and common housing 34 serves to define the cathode chamber for the entire electrolyzer.

Figure 7:
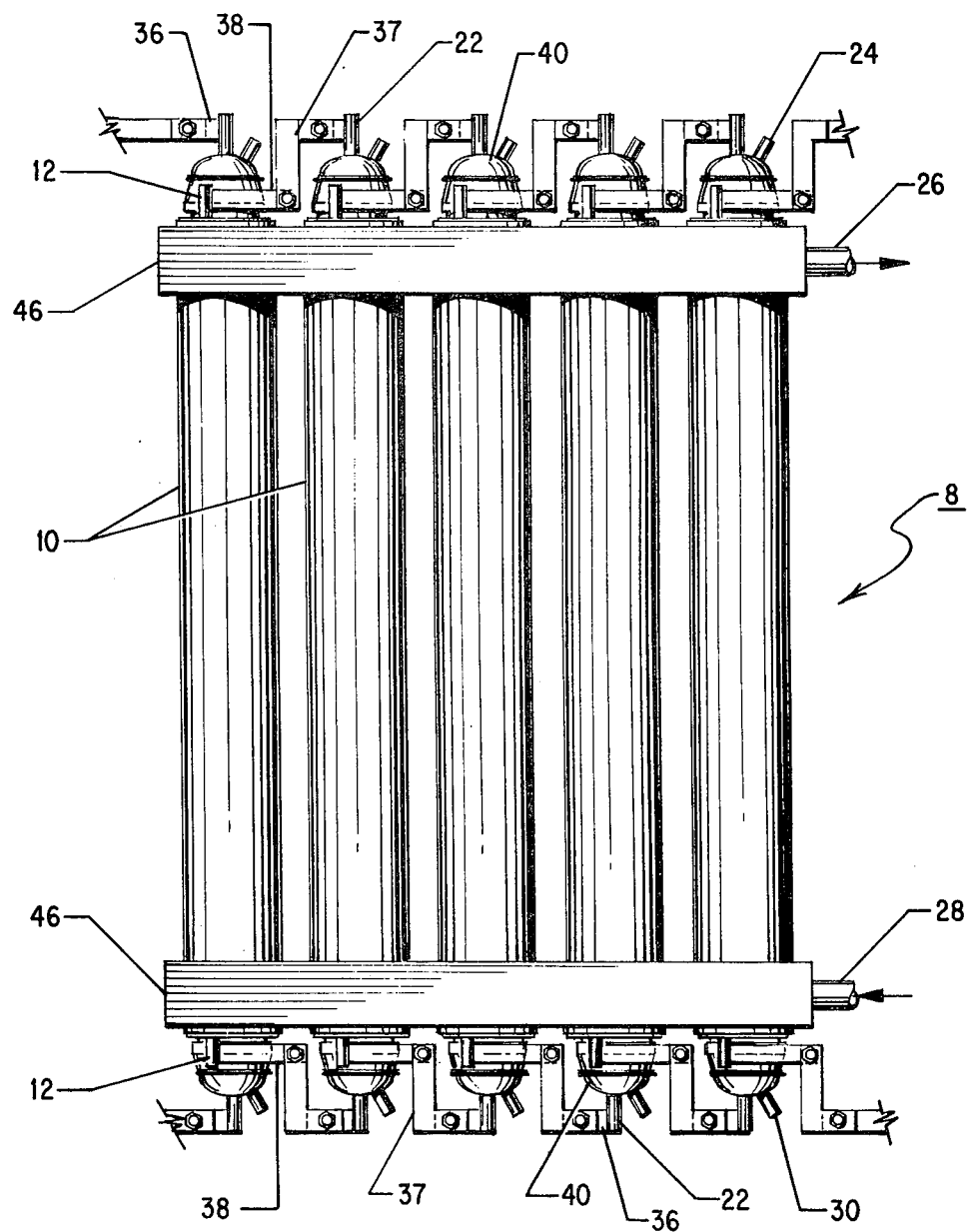
FIG. 7 is a side plan view of a further embodiment of a multi-cell electrolyzer in accordance with this invention.

Also in accordance with the invention, a multi-cell electrolyzer may utilize individual outer shells 10 fitted with common catholyte distributors 46 for introduction of fluid into the cathode compartment 50 and removal of alkali metal hydroxide and hydrogen gas products, as shown in FIG. 7.

OPERATION

During typical operation of the cell for the electrolysis of for example, aqueous sodium chloride solution, brine having a sodium chloride concentration of 120–310 grams per liter is introduced into the anode compartment 48 of the cell through inlet means 30, while water or recirculating sodium hydroxide solution (25–43 percent) is introduced into the cathode compartment 50 through inlet means 28. As the electrolyzing direct current is impressed on the cell from a suitable power source, chlorine gas is evolved at the anode 18. The evolved chlorine is completely retained within the membrane-anode structure, and is removed from the cell along with the depleted brine solution through outlet means 24. The sodium ions formed in the anode compartment 48 selectively migrate through the membrane 16 into the cathode compartment 50, where they combine with hydroxyl ions formed at the cathode 14. The sodium hydroxide and hydrogen gas thus formed are removed from the cell through outlet means 26. Non-critical process parameters include operating temperatures within the range of 25–100° C., feed brine pH of 1–6, and anode current densities on the order of 1.0–5.0 amperes per square inch.

In operation, the cell units may be disposed either horizontally or vertically. However a more or less vertical orientation is preferred since introduction of the brine at the cell bottom and removal of gaseous products from the top are thereby facilitated.

The concentric design of the cell also lends itself to operation under either reduced or higher than atmospheric pressure conditions. The tubular configuration has considerably more structural strength than planar-type cells of similar dimensions. Operation of the cell under pressures several times greater than atmospheric may result in the formation of smaller gas bubbles in the anolyte and correspondingly lower electrolysis voltage requirements, as well as lessening the required compressor capacity for eventual liquefaction of the chlorine produced.

Thus it is apparent that there has been provided, in accordance with the invention, as electrolytic cell that fully realizes the advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A cell for the electrolysis of alkali metal halide solutions, comprising in combination:
   a hollow tubular cathode member having liquid permeable walls;
   a hollow tubular anode member having liquid permeable walls and disposed concentrically within the cathode member along a common axis;
   an ion permeable tubular membrane disposed upon and covering the outer surface of the anode member, thereby separating the anode and cathode surfaces and forming anode and cathode compartments;
   means for introducing alkali metal halide solution into the anode compartment and for withdrawing halogen gas and depleted solution from the anode compartment;
   means for introducing liquid into the cathode compartment and for withdrawing gaseous and liquid products from the cathode compartment;
   an outer shell surrounding the cathode member to enclose the cathode compartment, and having apertures at each end in which the cathode member, membrane, and anode member are disposed and sealed.

2. A cell in accordance with claim 1 wherein the tubular membrane is permeable to the passage of cations and substantially impervious to hydrodynamic flow of electrolyte.

3. A cell in accordance with claim 2 wherein the tubular membrane comprises a cation permeable perfluorocarbon polymer having pendant sulfonic groups.

4. A cell in accordance with claim 1 wherein the ion permeable membrane is in the form of an extruded tube.

5. A cell in accordance with claim 1 wherein the anode member is a dimensionally stable composition.

6. A cell in accordance with claim 1 wherein the anode member comprises a valve metal base coated with an electrocatalytically active material.

7. A cell in accordance with claim 1 wherein the cathode member comprises a metal selected from mild steel, nickel or alloys thereof.

8. A cell in accordance with claim 1 wherein the anode and cathode members are formed from an expanded metal mesh.

9. A cell in accordance with claim 1 wherein the anode and cathode members are formed from a woven wire mesh.

10. A cell in accordance with claim 1 wherein the anode and cathode members are formed from perforated metal.

11. A cell in accordance with claim 1 wherein the conductor means for applying current to the anode member comprises a bar disposed within the tubular anode along its entire longitudinal axis and maintained in electrical contact with the anode along substantially its entire length by a plurality of radial contact members.

12. A cell in accordance with claim 1 wherein the conductor means for applying current to the anode member comprises at least one bar disposed within the tubular anode and in direct electrical contact therewith along substantially its entire length.

13. A cell in accordance with claim 1 wherein the conductor means for applying current to the cathode member comprises at least one bar disposed within the annular space between the tubular cathode and the outer shell and maintained in electrical contact with the cathode along substantially its entire length.

14. A cell in accordance with claim 1 wherein the anode and cathode members are more or less vertically disposed, the alkali metal halide solution is introduced into the bottom of the anode compartment, and halogen gas and depleted solution are withdrawn from the top of the anode compartment.

15. An electrolyzer for the electrolysis of alkali metal halide solutions, comprising a housing with top, bottom, and sides which encloses an array of cell units, each unit characterized by:
  a hollow tubular cathode member having liquid permeable walls;
  a hollow tubular anode member disposed concentrically within the cathode member along a common axis and having liquid permeable walls;
  an ion permeable tubular membrane disposed upon and covering the outer surface of the anode member, thereby separating the anode and cathode surfaces and forming a self-contained anode compartment;
  means for introducing alkali metal halide solution into the anode compartment and for withdrawing halogen gas and depleted solution from the anode compartment;
  means for introducing liquid into the housing to immerse the exposed cathode members and for withdrawing gaseous and liquid products from the housing;
  conductor means for applying an electrolysis current along substantially the entire length of the anode and cathode members;
  the housing having apertures on opposed sides through which the anode and cathode members extend and having means for sealing each cell unit in the apertures.

* * * * *